US010862683B2

(12) United States Patent
Medvinsky et al.

(10) Patent No.: US 10,862,683 B2
(45) Date of Patent: Dec. 8, 2020

(54) IMPLICIT RSA CERTIFICATES

(71) Applicant: ARRIS Enterprises LLC, Suwanee, GA (US)

(72) Inventors: Alexander Medvinsky, San Diego, CA (US); Eric J. Sprunk, Carlsbad, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 310 days.

(21) Appl. No.: 15/599,842

(22) Filed: May 19, 2017

(65) Prior Publication Data
US 2017/0338958 A1 Nov. 23, 2017

Related U.S. Application Data

(60) Provisional application No. 62/338,629, filed on May 19, 2016.

(51) Int. Cl.
*H04L 9/30* (2006.01)
*H04L 9/32* (2006.01)
*G06F 7/72* (2006.01)
*H04L 9/00* (2006.01)

(52) U.S. Cl.
CPC .......... *H04L 9/302* (2013.01); *H04L 9/3249* (2013.01); *H04L 9/3263* (2013.01); *G06F 7/727* (2013.01); *H04L 9/004* (2013.01)

(58) Field of Classification Search
CPC .............................. H04L 9/302; H04L 9/3294
See application file for complete search history.

(56) References Cited

U.S. PATENT DOCUMENTS

| 5,218,637 A * | 6/1993 | Angebaud ............ G06Q 20/341 705/67 |
| 5,633,929 A * | 5/1997 | Kaliski, Jr. ............ H04L 9/0894 380/28 |
| 5,675,649 A * | 10/1997 | Brennan .................. H04L 9/085 380/286 |
| 2002/0154779 A1* | 10/2002 | Asano .............. G11B 20/00086 380/277 |
| 2005/0018852 A1* | 1/2005 | Camenisch ............. H04L 9/302 380/277 |
| 2006/0083370 A1* | 4/2006 | Hwang .................. H04L 9/0891 380/28 |

(Continued)

OTHER PUBLICATIONS

PCT Search Report & Written Opinion, Re: Application No. PCT/US2017/033541, dated Aug. 16, 2017.

(Continued)

*Primary Examiner* — Jason Chiang
(74) *Attorney, Agent, or Firm* — Chernoff Vilhauer LLP

(57) ABSTRACT

A secure digital communications method is provided in which a Certificate Authority generates an improved RSA key pair having a modulus, a public key exponent, a public key, and a private key. The public key exponent can contain descriptive attributes and a digital signature. The digital signature can be responsive to the descriptive attributes and the modulus. A secure session can be established between a first system and a second system, within a secure digital communication protocol. The second system can verify the digital signature to authenticate the public key.

19 Claims, 15 Drawing Sheets

(56) References Cited

U.S. PATENT DOCUMENTS

| | | | | |
|---|---|---|---|---|
| 2006/0137006 A1* | 6/2006 | Ramzan | .................. | G06F 21/33 |
| | | | | 726/21 |
| 2006/0251248 A1* | 11/2006 | Lipson | .................... | H04L 9/302 |
| | | | | 380/44 |
| 2007/0180225 A1* | 8/2007 | Schmidt | .................. | H04L 9/321 |
| | | | | 713/152 |
| 2009/0296938 A1* | 12/2009 | Devanand | ............ | H04L 9/0631 |
| | | | | 380/278 |
| 2013/0046972 A1 | 2/2013 | Campagna et al. | | |
| 2013/0227277 A1 | 8/2013 | Campagna et al. | | |
| 2013/0290704 A1* | 10/2013 | Giniger | ............... | H04L 63/0272 |
| | | | | 713/156 |
| 2014/0244998 A1* | 8/2014 | Amenedo | ............. | H04L 63/062 |
| | | | | 713/156 |
| 2015/0089216 A1* | 3/2015 | Benoit | .................. | H04W 12/06 |
| | | | | 713/156 |
| 2016/0043870 A1* | 2/2016 | Avanzi | .................... | H04L 9/302 |
| | | | | 713/176 |

OTHER PUBLICATIONS

IGOE National Security Agency D. Stebilia Queensland University of TechnologyK, "X.509v3 Certificates for Secure Shell Authentication; RFC6187.txt", X.509V3 Certificates for Secure Shell Authentication RFC6187.TXT, Internet Engineering Task Force, IEFT, Standard Internet Society (ISOC), Mar. 31, 2011, pp. 1-16.

* cited by examiner

IMPLICIT RSA CERTIFICATES

CLAIM OF PRIORITY

This Application claims priority under 35 U.S.C. § 119(e) from earlier filed U.S. Provisional Application Ser. No. 62/338,629, filed May 19, 2016, which is hereby incorporated by reference.

TECHNICAL FIELD

The present disclosure relates to the field of secure digital communications, particularly systems and methods that provide authentication amongst communicating entities, thereby preventing inappropriate communications and/or other transactions.

BACKGROUND

Infrastructure for services such as internet connectivity and streaming media delivery employ diverse networked hardware and software system elements. Secure communication between networked elements is vital to many operations.

In a typical maintenance scenario, a local user such as a technician or engineer interacts directly with a local device such as a tablet or personal computer to connect with a remote device. In some cases, the remote device can be a Customer Premises Equipment (CPE) device such as a gateway, modem, digital video recorder (DVR), or set-top video interface. In some cases, the remote device can be equipment typical of video broadcast and/or distribution facilities. Such equipment can comprise functions for encoding, decoding, transcoding, inserting advertisements, storing, playing back, and others. The local user may utilize such a connection to invoke remote command-line login, remote command execution, and/or other network services.

Such a connection can comprise both secure and unsecured network connections. By way of example, a technician can use a local device connected to an unsecured network such as a public Wi-Fi hotspot to communicate with a remote device. Many useful scenarios require and/or benefit from operating network services securely over an unsecured network.

A Secure Shell (SSH) protocol can provide a secure channel over an unsecured network in a client-server architecture, connecting an SSH client application with an SSH server. Common applications include remote command-line login and remote command execution, but any network service can be secured with SSH. The use of SSH can be advantageous in comparison to less secure protocols such as Telnet because SSH offers an encrypted session which prevents passive network snooping attacks. User passwords are sent over an encrypted session with SSH, but they are sent in the clear via Telnet.

However, security challenges to SSH remain. Some protocols such as SSH utilize public keys and asymmetric cryptography as a very weak form of authentication. Some such SSH protocols are specified by Internet Engineering Task Force (IETF) Request for Comments (RFC) documents 4252 and 4253. An SSH client can typically obtain an RSA public key of the server and can display a hash, such as a SHA-1 or MD5 hash, of the public key to a user, asking the user to authorize this SSH public key. In typical scenarios, a user may not be able and willing to both obtain a SSH server's public key hash in advance, and to compare a large string of hex characters, in order to verify the identity of a SSH server as the SSH server that the user is expecting.

Absent such identity verification of the SSH server, the protocol is at risk of man-in-the-middle (MITM) attacks. In a MITM attack, an attacker can secretly relay and possibly alter communication between two parties that are unaware of an interposed MITM entity. In such an attack, a MITM may be able to steal a SSH client's password and to submit the MITM's unauthorized commands to a remote SSH server. Other protocols can be similarly at risk.

Authentication of the SSH server's public keys can block such MITM attacks. Some SSH authentication problems have been addressed and/or solved within IETF based on RFC 6187 which extends the SSH protocol to include X.509 digital certificate based authentication. Although this approach has been available for some time, there remain Linux distributions and other notable SSH implementations that do not support this use of X.509 certificates. Some protocols and protocol implementations may embody a choice not to use X.509 digital certificates in order to avoid the complexity of the X.509 digital certificate standard and/or to conserve available bandwidth.

Some standards bodies may decide against the use of the certificate based SSH (as specified by RFC 6187) due to a scarcity of available implementations. In some cases, working groups may choose to compromise security in favor of an option to reuse a default version of SSH that ships with some standard Linux distributions.

Thus what is needed are alternative systems and methods for authenticating a SSH server's public keys. Particularly needed are systems and methods absent barriers to adoption that are posed by implementation of RFC 6187.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for secure digital communications including the steps of: a Certificate Authority generating an asymmetric key pair including a first public key and a private key; where the first public key includes descriptive attributes and a digital signature; and, where the digital signature is responsive to at least part of the first public key. Other embodiments of this aspect include corresponding computer systems, apparatus, and computer programs recorded on one or more computer storage devices, each configured to perform the actions of the methods.

Implementations may include one or more of the following features. The method: where the asymmetric key pair is an RSA key pair; where the RSA key pair includes a modulus, a public key exponent, the first public key, and the private key; where the public key exponent includes descriptive attributes and a digital signature; and, where the digital signature is responsive to the modulus and the descriptive attributes. The method further including the steps of: passing the modulus and the public key exponent from a first system to a second system; establishing a secure session between the first system and the second system, within a secure digital communication protocol, responsive to the modulus and the public key exponent; and, the second system verifying the digital signature, responsive to the modulus and the public key exponent, thereby authenticating the first public key. The method: where the secure digital communication protocol is SSH. The method: where the descriptive attributes include a name corresponding to the Certificate Authority. The method: where the descriptive attributes include a validity period corresponding to the first public key. The method: where the descriptive attributes include a unique identity corresponding to a customer premises equipment device. The method further including the step of: installing the RSA key pair in a customer premises equipment device, where installation of the RSA key pair takes place within a customer premises equipment device manufacturing facility. The method further including the steps of: generating large random prime numbers p and q according to an RSA algorithm; applying validity tests to a first candidate public key exponent, thereby determining that the first candidate public key exponent is invalid; and, regenerating p and q upon determining that the first candidate public key exponent is invalid, thereby providing a second candidate public key exponent; where the modulus is responsive to p and q. The method: where a Certificate Authority public key corresponds to the Certificate Authority; and, where the Certificate Authority public key is an Elliptic Curve public key. The method: where the Certificate Authority employs an Elliptic Curve Digital Signature Algorithm or an Edwards Digital Signature Algorithm, thereby providing the digital signature. The method further including the steps of: passing the modulus and the public key exponent from a first system to a second system; establishing a secure session between the first system and the second system, within a secure digital communication protocol, responsive to the modulus and the public key exponent; and, the second system detecting an invalid public key, responsive to the modulus and the public key exponent; and, aborting the secure session, responsive to the detection of an invalid public key. The method: where the secure digital communication protocol is SSH. The method: where the descriptive attributes include a name corresponding to the Certificate Authority. The method: where the descriptive attributes include a validity period corresponding to the first public key. The method: where the descriptive attributes include a unique identity corresponding to a customer premises equipment device. The method further including the step of: installing the RSA key pair in a customer premises equipment device, where installation of the RSA key pair takes place within a customer premises equipment device manufacturing facility. The method further including the steps of: generating large random prime numbers p and q according to an RSA algorithm; applying validity tests to a first candidate public key exponent, thereby determining that the first candidate public key exponent is invalid; and, regenerating p and q upon determining that the first candidate public key exponent is invalid, thereby providing a second candidate public key exponent; where the modulus is responsive to p and q. The method: where a Certificate Authority public key corresponds to the Certificate Authority; and, where the Certificate Authority public key is an Elliptic Curve public key. The method: where the Certificate Authority employs an Elliptic Curve Digital Signature Algorithm or an Edwards Digital Signature Algorithm, thereby providing the digital signature. Implementations of the described techniques may include hardware, a method or process, or computer software on a computer-accessible medium.

BRIEF DESCRIPTION OF THE DRAWINGS

Further details of the present invention are explained with the help of the attached drawings in which.

DETAILED DESCRIPTION

Figure 1:
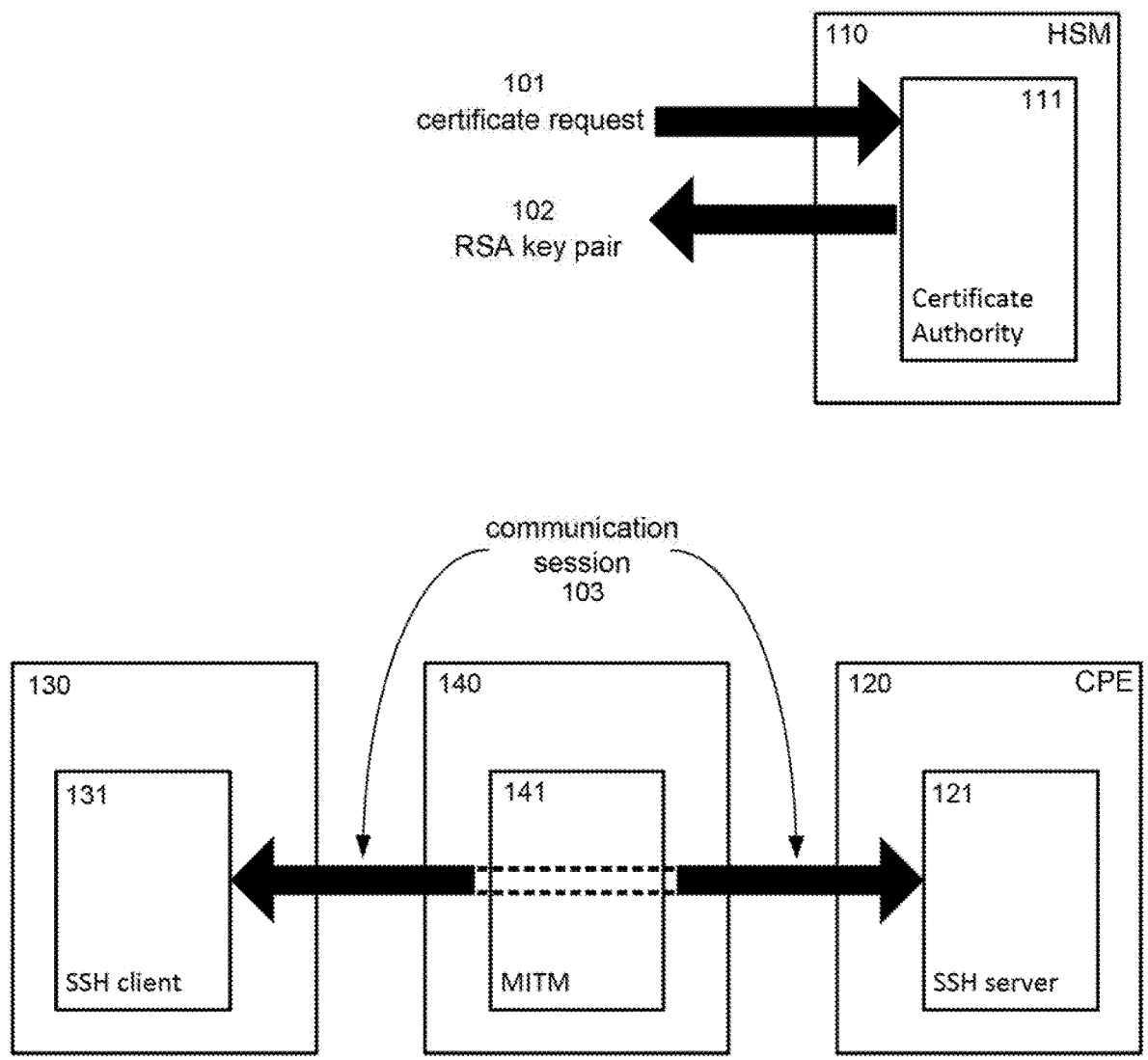
FIG. 1 depicts an exemplary system embodiment utilizing implicit RSA certificates.

FIG. 1 depicts a system embodiment utilizing implicit RSA certificates. Upon receiving a certificate request 101, a Certificate Authority (CA) 111 process can generate an asymmetric key pair 102 that can be an RSA key pair. The generated (RSA) key pair 102 can comprise a digital signature of the Certificate Authority 111, thus providing an 'implicit RSA certificate.' Elements of (RSA) key pair 102 can be employed to establish and/or maintain a secure communications session 103 between a client 131 process and a server 121 process according to a protocol that can be SSH. In some embodiments, the secure communications session 103 can be at risk from interactions with a man-in-the-middle attack process MITM 141. In some such embodiments that risk can be mitigated by verifying an implicit RSA signature inside a public exponent. In other typical embodiments, no MITM 141 process is present to interact with or otherwise affect communication session 103.

A requestor of the certificate request 101 can be a person or a process. In some embodiments such a request process can employ a graphical user interface (GUI). In other embodiments, the request process can employ an electronic transaction interface which can be protected by a secure protocol such as TLS or IPsec in which the requesting entity can use a password as a credential.

In some embodiments, a hardware security module (HSM) 110 can provide some functionality to CA 111. In some embodiments, a hardware security module 110 can generate, store, and otherwise operate on and with key pairs.

In some embodiments server 121 process can be partially or completely hosted by Customer Premises Equipment (CPE) 120. By way of example and not limitation CPE 120 can comprise a gateway, modem, digital video recorder (DVR), or set-top video interface. In alternative example, in some embodiments server 121 process can be partially or completely hosted by equipment 120 typical of video broadcast and/or distribution facilities. Such equipment can comprise functions for encoding, decoding, transcoding, inserting advertisements, storing, playing back, and others. In some embodiments comprising subscribers, server 121 operations can be accurately characterized as managing subscriber authorizations.

In some embodiments client 131 process can be partially or completely hosted by client equipment 130. By way of example and not limitation client equipment 130 can comprise a personal computer, tablet computer, or smart phone.

Notably, in some embodiments communication session 103 can be advantageously employed in support of remote operation of equipment 120. Users and/or processes local to equipment 130 can participate in remote operation of equipment 120 via network services supported by communication session 103. By way of example and not limitation, remote operation can comprise diagnostic, maintenance, and/or other operational features of equipment 120. The security of communication session 103 can be a vital feature of such remote operations.

In some embodiments MITM 141 process can be partially or completely hosted by MITM equipment 140. In some embodiments, MITM equipment 140 can interrupt and interpose communications between client 131 and server 121.

By way of example and not limitation, a man-in-the-middle attack scenario can comprise a client 131 process hosted by a smart phone 130 connected wirelessly with an unsecured Wi-Fi hotspot MITM equipment 140, the equipment 140 further connected via the internet with server 121 process. Communications between client 131 and server 121 can be interrupted and/or altered by a MITM 141 process hosted by equipment 140. DNS spoofing, also known as DNS cache poisoning, is one well-known technique for instantiating a MITM 141 process in such equipment 140.

Notably, many of the embodiments herein depicted and described specifically identify and/or describe key pair 102 and other embodiments of key pairs as RSA key pairs. Not all embodiments are so limited, thus some embodiments can comprise alternative embodiments of asymmetric key pairs that are not necessarily RSA key pairs.

Figure 2:
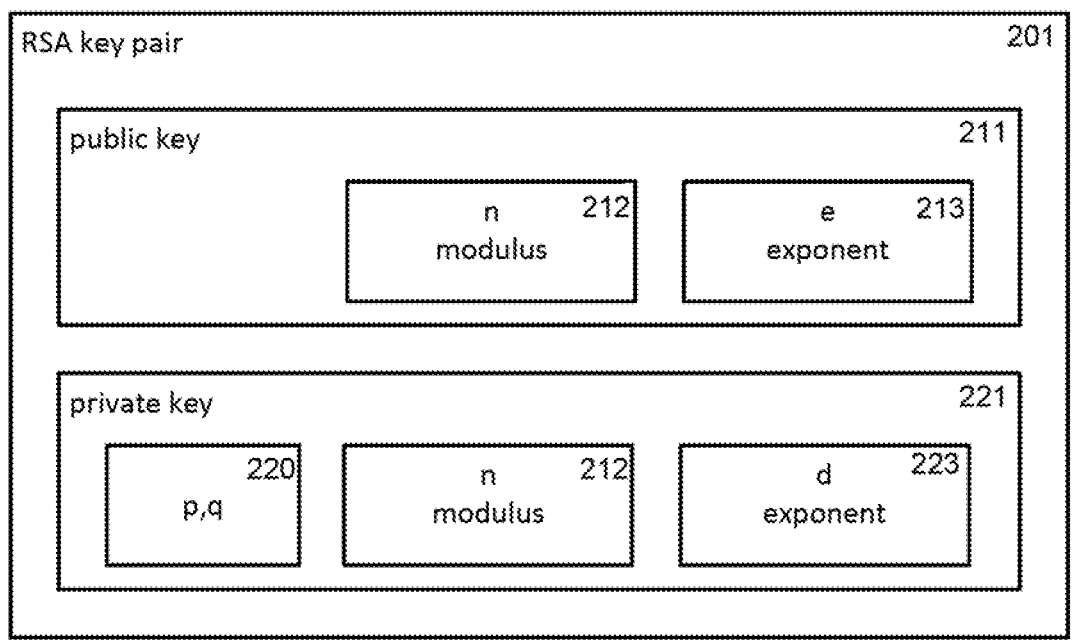
FIG. 2 depicts exemplary embodiments of RSA key pairs.
Figure 2:
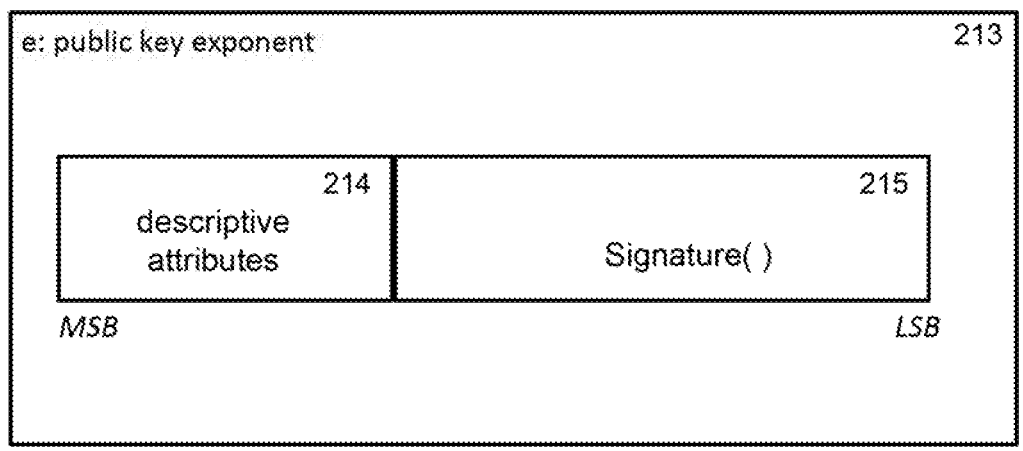

FIG. 2 depicts embodiments of an RSA key pair 201. A Certificate Authority (CA), such as CA 111 described and depicted in FIG. 1, can generate RSA key pairs that implicitly include that Certificate Authority's digital signature. Such a RSA key pair 201 comprises public key 211 and private key 221. Public key 211 comprises modulus n 212 and public key exponent e 213. Private key 221 comprises modulus n 212 and private key exponent d 223. Notably, both public key 211 and private key 221 comprise the same modulus n 212. A private key 221 can be described as deriving from a corresponding public key 211 of the RSA key pair 201. More precisely, private exponent d 223 can be derived from the public key 211. There are other elements of the private key that are typically not derived from the public key. Private key exponent d 223 derives from public key exponent e 213, and parameters 220 p and q, where p and q are two large random prime numbers generated within the well-known RSA algorithm. Private key 221 can be described as further comprising parameters 220 p and q.

Public key exponent e 213 can comprise descriptive attributes 214 and a digital signature Signature( ) 215. Descriptive attributes 214 can comprise several items. In some embodiments descriptive attributes 214 can comprise none of, or one or more of items: a validity period corresponding to the public key 211; a unique certificate serial number; and, an identifier of a Certificate Authority that generated Signature( ) 215. In some embodiments descriptive attributes 214 can comprise items in addition to and/or alternative to a validity period corresponding to the public key 211; a unique certificate serial number; and, an identifier of a Certificate Authority that generated Signature( ) 215.

The validity period corresponding to the public key can comprise starting and ending timestamps. The timestamps can define a period of validity of the public key.

A device, such as a customer premises equipment device, can comprise a unique identity. The unique certificate serial number can represent the unique identity of such a device. Thus the descriptive attributes can comprise a unique identity corresponding to a customer premises equipment device.

The identifier of a Certificate Authority that generated Signature( ) 215 can comprise a name corresponding to the Certificate Authority. The most significant bits (MSB) of public key exponent e 213 can be allocated to descriptive attributes 214. The least significant bits (LSB) of public key exponent e 213 can be allocated to Signature( ) 215. In alternate embodiments descriptive attributes 214 can be concatenated with Signature( ) 215 by a variety of techniques, forming e 213. By way of examples and not limitations, such concatenation techniques can comprise prepending, postpending, and others.

In some embodiments a Certificate Authority can generate Signature( ) responsive to modulus n 212 and further responsive to each of the items of the descriptive attributes 214. That is, the signature can be over a hash over all of the items as well as over the modulus n 212. In alternative embodiments a Certificate Authority can generate Signature( ) responsive to modulus n 212 but not responsive to any of the elements of the descriptive attributes 214. In further alternative embodiments a Certificate Authority can generate Signature( ) responsive to modulus n 212 and responsive to some of the elements of the descriptive attributes 214.

Figure 3A:
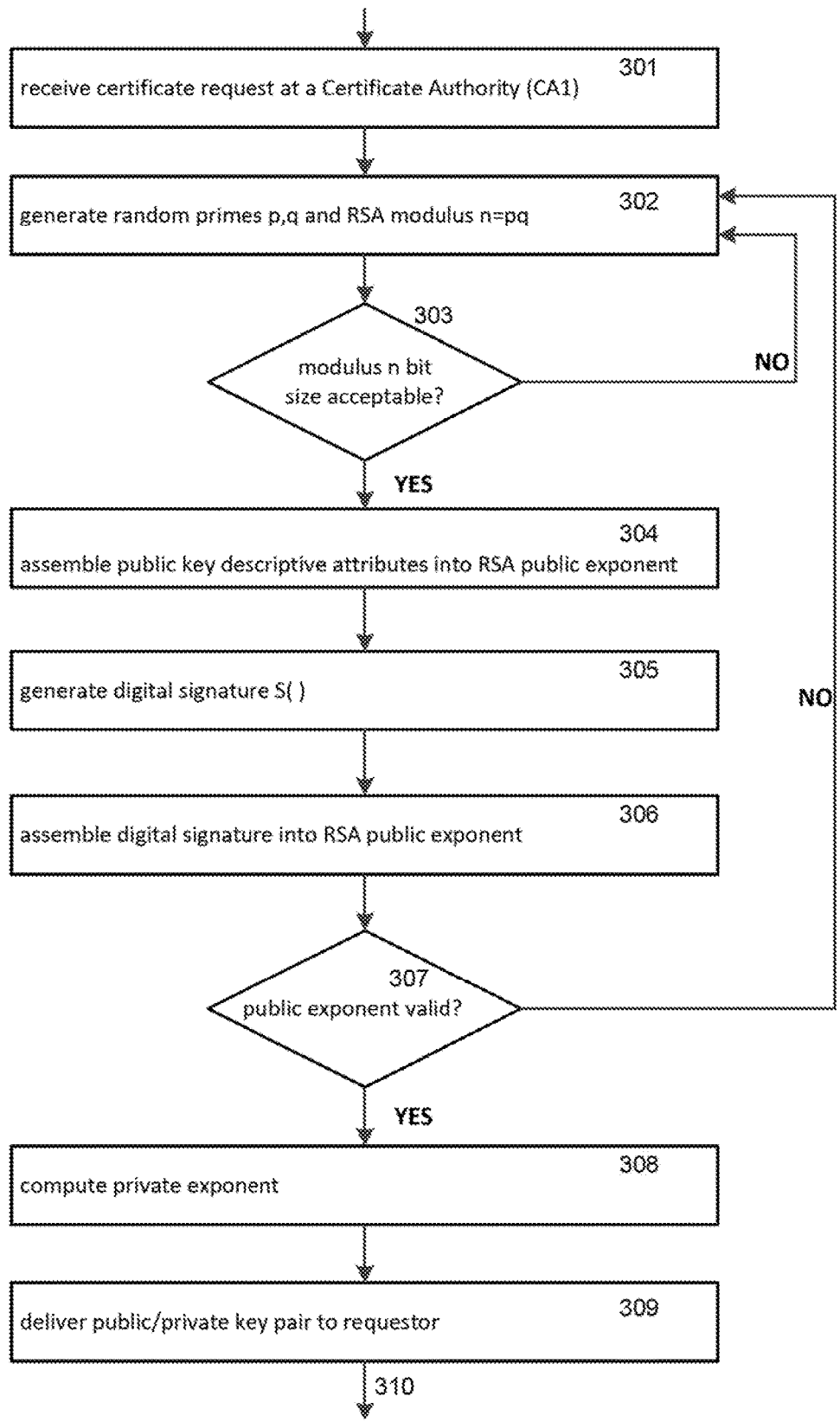
FIG. 3A depicts a flowchart of an exemplary process for providing an implicit RSA key pair.

FIG. 3A depicts a flowchart of an exemplary process for providing an implicit RSA key pair 201 such as depicted in FIG. 2. In step 301, a first Certificate Authority (CA1) receives a certificate request. In step 302, according to the RSA algorithm well known in the related arts, two large random prime numbers p and q are generated. A modulus n can be obtained as the product of p and q; n=pq. In step 303, the size of modulus n can be evaluated for acceptability. If the resultant modulus n is slightly smaller than expected, step 302 can be restarted to obtain new p and q. By way of example, in some typical embodiments, a commonly used and considered secure size of an RSA modulus is 2048 bits. In that case, a bit size of each of p and q can be approx. 1024 bits. Multiplication of p and q each of that size can result in a slightly smaller bit total, such as 2047 bits. In such a case, the modulus can be deemed unacceptable (NO) and control flow returns to step 302. In step 302, a new p and q can be generated. If the size of the modulus is deemed acceptable (YES), control flow can continue to step 304.

Further, in step 304, descriptive attributes 214 can be assembled into RSA public exponent e 213 as depicted and described herein with regards to FIG. 2. In step 305, the Certificate Authority can utilize its signing key to generate a digital signature, shown within FIG. 2 as Signature( ) 215. In some embodiments, the signature can be generated over the modulus n. In other embodiments, the signature can be generated over the modulus n in combination with one or more of public key descriptive attributes 214 such as depicted and described in relation to FIG. 2. In step 306, the Certificate Authority's digital signature can be assembled into RSA public exponent e.

Many existing signature padding schemes can operate successfully in combination with these embodiments. Some examples comprise use of the PKCS #1 standard with either PKCS #1v1.5 padding or with RSA-PSS padding which provides additional security. The PKCS #1 standard is defined by IETF in RFC3447. Within these embodiments, the Certificate Authority RSA public key can be assumed to have the same modulus size as the size of the RSA key pair that is being generated.

Step 307 can determine whether or not a candidate public key exponent can be a valid public key exponent, suitable for use in the public key. (The terms public exponent and public key exponent are used interchangeably herein. The terms candidate public exponent and candidate public key exponent are used interchangeably herein.) In some embodiments, such a candidate public exponent can be Signature( ) 215, In other embodiments, the candidate public exponent can be Signature( ) 215 combined with descriptive attributes 214. Other RSA algorithm embodiments typically use a value for a public exponent of 65537. The present embodiments can provide a much larger candidate public exponent, comprising the Certificate Authority's signature. A particular signature, or a particular signature in combination with particular descriptive attributes, may or may not provide for a valid public exponent.

A first test for validity is to verify that a candidate public exponent (e) is numerically smaller than modulus n. If e is greater or equal to n, e is an invalid public exponent. In some embodiments, a second test for validity can be to verify that e is relatively prime to both p−1 and q−1. If e is not relatively prime to both p−1 and q−1, e is an invalid public exponent. In other words, necessary conditions for a valid RSA public exponent include GCD(e, p−1)=1 and GCD(e, q−1)=1, where GCD( ) is a Greatest Common Denominator operator.

In some alternate embodiments, another test for validity can be to verify that e is relatively prime to Carmichael's totient function $\lambda(n)$ applied to (p−1) and (q−1). The Carmichael's totient function can be evaluated using $\lambda(n)$=lcm (p−1, q−1), where function lcm( ) provides the least common multiple of its arguments; in this case the arguments are (p−1) and (q−1). In some embodiments, this test can serve in place of the second test described immediately above. In some embodiments, one or more of the tests described can be employed alone and/or in combination with each other and/or other validity tests.

If any of these tests determine that candidate public exponent e is invalid, control flow returns to Step 302, wherein new p and q can be generated, resulting in generation of another candidate public exponent. Testing and generation of candidate public key exponents can continue until a valid candidate public exponent is determined, upon which control flow can continue to Step 308

At step 308, a public exponent e is known to be valid, thus any one of many well-known cryptographic methods can be employed to generate a corresponding private exponent d. By way of examples, in some embodiments d can be generated by:

1a) Compute Euler's totient function $\varphi(n)=(p-1)(q-1)$; and,

1b) Compute $d=e^{-1} \bmod \varphi(n)$, the modular multiplicative inverse of e modulo $\varphi(n)$.

In some alternative embodiments, d can be generated by:

2a) Compute Carmichael's totient function $\lambda(n)=\text{lcm}(p-1, q-1)$ where the lcm( ) function provides the least common multiple of its arguments; and, 2b) Compute $d=e^{-1} \bmod \lambda(n)$, the modular multiplicative inverse of e modulo $\lambda(n)$.

The Extended Euclidean algorithm, well-known in the art of cryptography, can be utilized to compute the modular inverse for (1b) or (2b).

In Step 309, the resulting public/private key pair, which is an implicit RSA key pair 201 as depicted in FIG. 2, can be delivered to an entity that provided the request of Step 301. Such an entity can be a user, a computer system, or another type of device.

At this control flow point 310, the entity can utilize the RSA public/private key pair 201 comprising e, d and n, where e implicitly includes a Certificate Authority signature. This RSA key pair 201 can be described as comprising an 'implicit RSA certificate.' In typical embodiments for secure communication sessions, the private exponent d must be kept as a secret by the entity, while the public key consisting of e and n can be provided to a protocol such as Secure Shell (SSH). In some Linux installation embodiments, an unmodified SSH server or daemon also known as SSHD can operate successfully with such an RSA keypair. Within SSH key agreement and authentication, the public key of SSHD can be sent to an SSH client.

A system that is receiving such an implicitly signed RSA public key can add a new authentication step. This system can utilize a well-known and pre-established RSA public key of a Certificate Authority to validate the value of e, which comprises a digital signature over the RSA modulus n. The supplied RSA public key can be trusted only if the Certificate Authority signature embedded inside the public exponent e can be verified. In the case of SSH, while no protocol modifications are necessary, SSH client implementations can be updated with such a verification step in order to provide authentication.

Figure 3B:
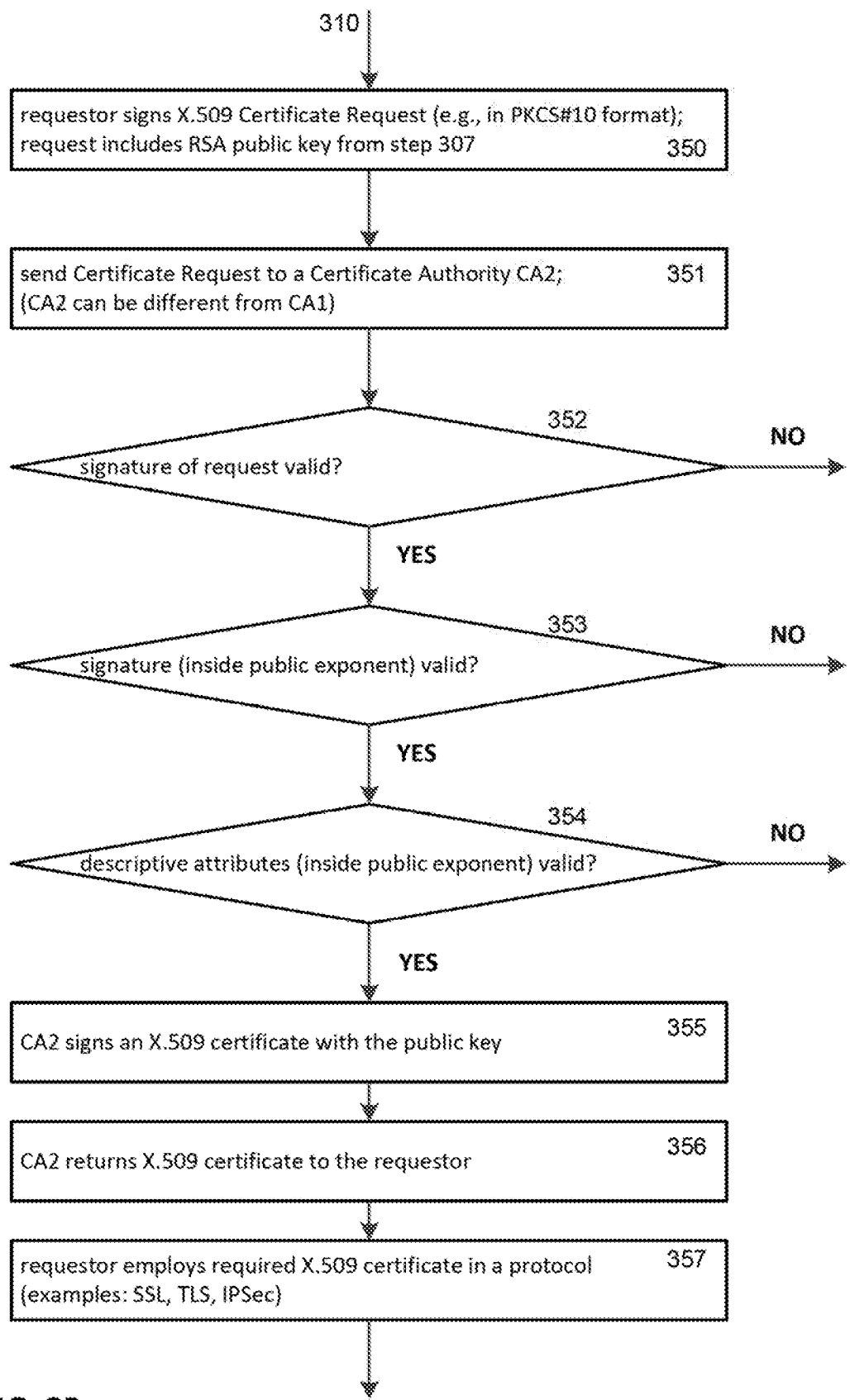
FIG. 3B depicts a flowchart of an exemplary process for providing an X.509 certificate, employing an implicit RSA key pair.

FIG. 3B depicts a flowchart of an exemplary process for providing an X.509 certificate, employing an implicit RSA key pair. In some embodiments, control flow 310 can continue from steps shown in FIG. 3A. Methods are presented herein employing implicit certificates inside PKCS #10 standard certification requests.

Public Key Cryptography Standard #10 (PKCS #10) provides a published certification request specification. PKCS #10 specifies a format for messages sent to a certification authority to request certification of a public key. Certificate requests according to PKCS #10 are in common use.

The PKCS #10 specification includes a self-signed structure with a public key, subject name, and optional extensions, all signed with a private key that corresponds to a public key in a PKCS #10 object. PKCS #10 provides for self-signed requests but such a signature is typically not sufficient to verify the requestor. In typical embodiments, an out-of-band method can be employed to verify the requestor.

An in-band method can be advantageously provided by including an implicit RSA certificate inside a PKCS #10 request. This enables a Certificate Authority to verify a requestor based on a signature inside the public exponent e. In an embodiment, verification of the signature with a pre-configured Certification Authority public key can be required in order for the Certificate Authority to issue a certificate.

In some embodiments, devices can be manufactured with implicit RSA certificates signed by the manufacturer. By way of example and not limitation, such devices can comprise those that acquire pay TV content, such as digital set-tops or video gateways. In some embodiments, such a device can be a customer premises equipment device. In some embodiments, installation of an implicit RSA certificate comprising an RSA key pair can take place within a manufacturing facility that manufactures such devices. In some embodiments, installation of the RSA key pair can take place within a customer premises device manufacturing facility. In some embodiments, a network operator or content provider can provision such devices with their own operator-specific certificates.

An operator can receive a PKCS #10 request that includes an implicit RSA Certificate, verify the signature inside e, and then issue a certificate for the operator's network. Thus implicit certificates can be employed to assure a network operator that it is in communication with an authentic device from a particular manufacturer, and that the device is authorized to receive an operator-specific certificate.

Notably, a digital certificate obtained on the basis of such a PKCS #10 request can be described as a double-certificate. Public exponent e remains with the signature from the device manufacturer. The RSA public key consisting of e and n can be placed inside another signed X.509 certificate that also includes a network operator's signature. An entity receiving such a certificate can cryptographically validate the identities of both the device manufacturer and the network operator.

In some alternative embodiments, a certificate request can be according to a format other than the PKCS #10 format and can suffice. In some alternative embodiments, a certificate issued by a network operator or content provider can be according to a format other than the X.509 format and can suffice.

In step 350, a requestor can sign a certificate request. The certificate request can be formatted as specified by PKCS #10. The request can comprise an RSA public key as provided by step 307. In step 351, the certificate request can be sent to a Certificate Authority (CA2) that can be a different entity than the Certificate Authority (CA1) depicted and described in relation to FIG. 3A. In step 352, validity of the certificate request signature of step 350 can be determined. If valid, control flow continues to step 353. In step 353, validity of the signature within the public exponent can be determined. If valid, control flow continues to step 354.

In the step 354, validity of the descriptive attributes within the public exponent can be determined. If valid, control flow continues to step 355. By way of example and not limitation, in some embodiments, a check can be made as to whether a current time of day falls within a validity period specified by the descriptive attributes. In a scenario where the validity period check is satisfied and other descriptive attributes are similarly found to be satisfactorily valid, control flow can continue (YES) to step 355.

In step 355, CA2 can sign an X.509 certificate with the public key. In step 356, CA2 can return the signed X.509 certificate to the requestor of step 350. In step 357, the requestor can employ the signed X.509 certificate in a specific protocol. By way of example and not limitation, such a protocol can be SSL, TLS, or IPSec.

Figure 3C:
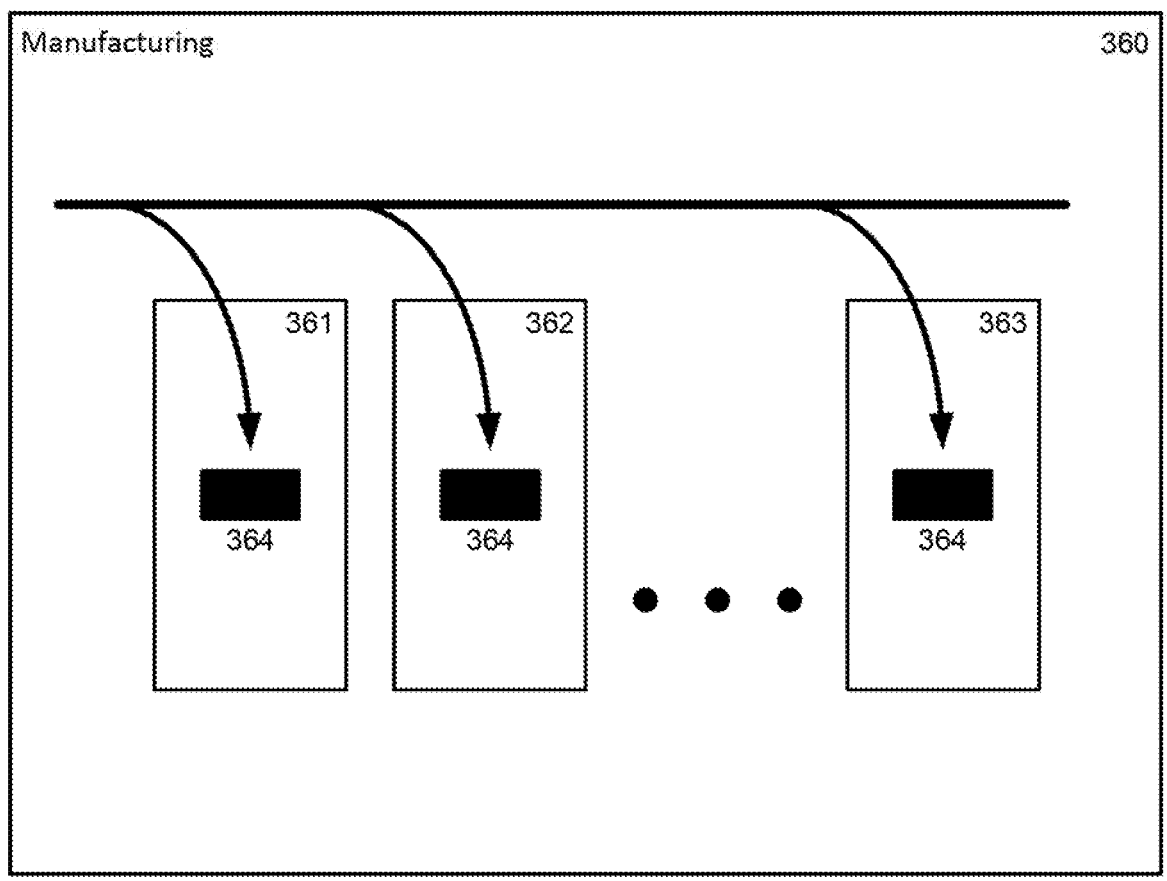
FIG. 3C depicts an exemplary embodiment for manufacturing devices with implicit RSA certificates signed by the manufacturer of the devices.

FIG. 3C depicts an exemplary embodiment for manufacturing devices with implicit RSA certificates signed by the manufacturer of the devices. One or more devices 361, 362, . . . 363 that can be CPE devices can be within a manufacturing 360 process and/or facility. In some embodiments, manufacturing 360 can comprise a CPE device manufacturing facility. Within manufacturing 360, a RSA key pair 364 comprising an implicit RSA certificate can be installed in each device 361, 362, . . . 363. The RSA key pair 364 can comprise a signature corresponding to a manufacturer, such as a manufacturer corresponding to manufacturing 360 process and/or facility. In some embodiments, installation of RSA key pair 364 within devices 361, 362, . . . 363 can take place with a CPE device manufacturing facility.

Figure 3D:
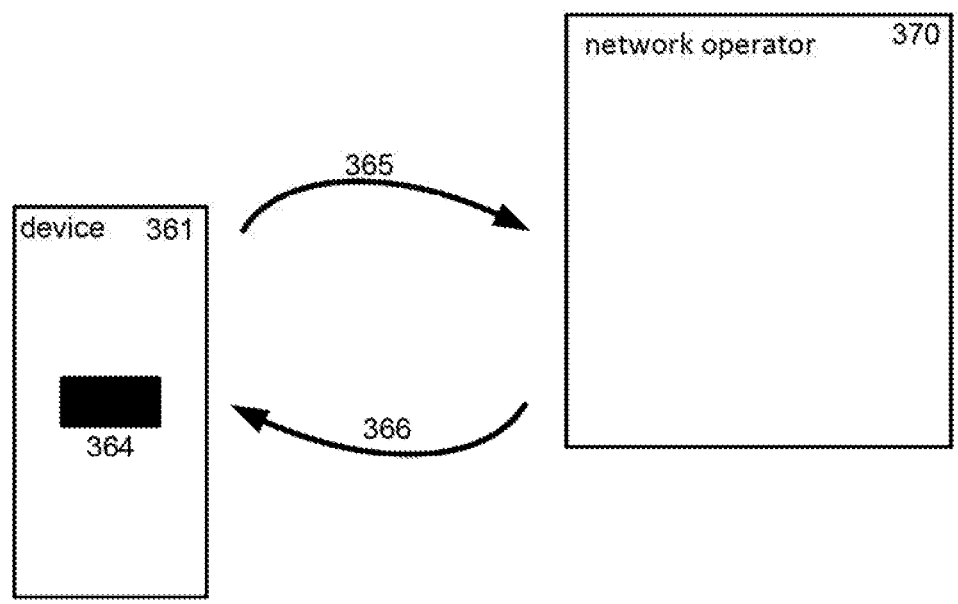
FIG. 3D depicts an exemplary embodiment of a device with a RSA certificate signed by the manufacturer, interacting with a network operator.
Figure 4A:
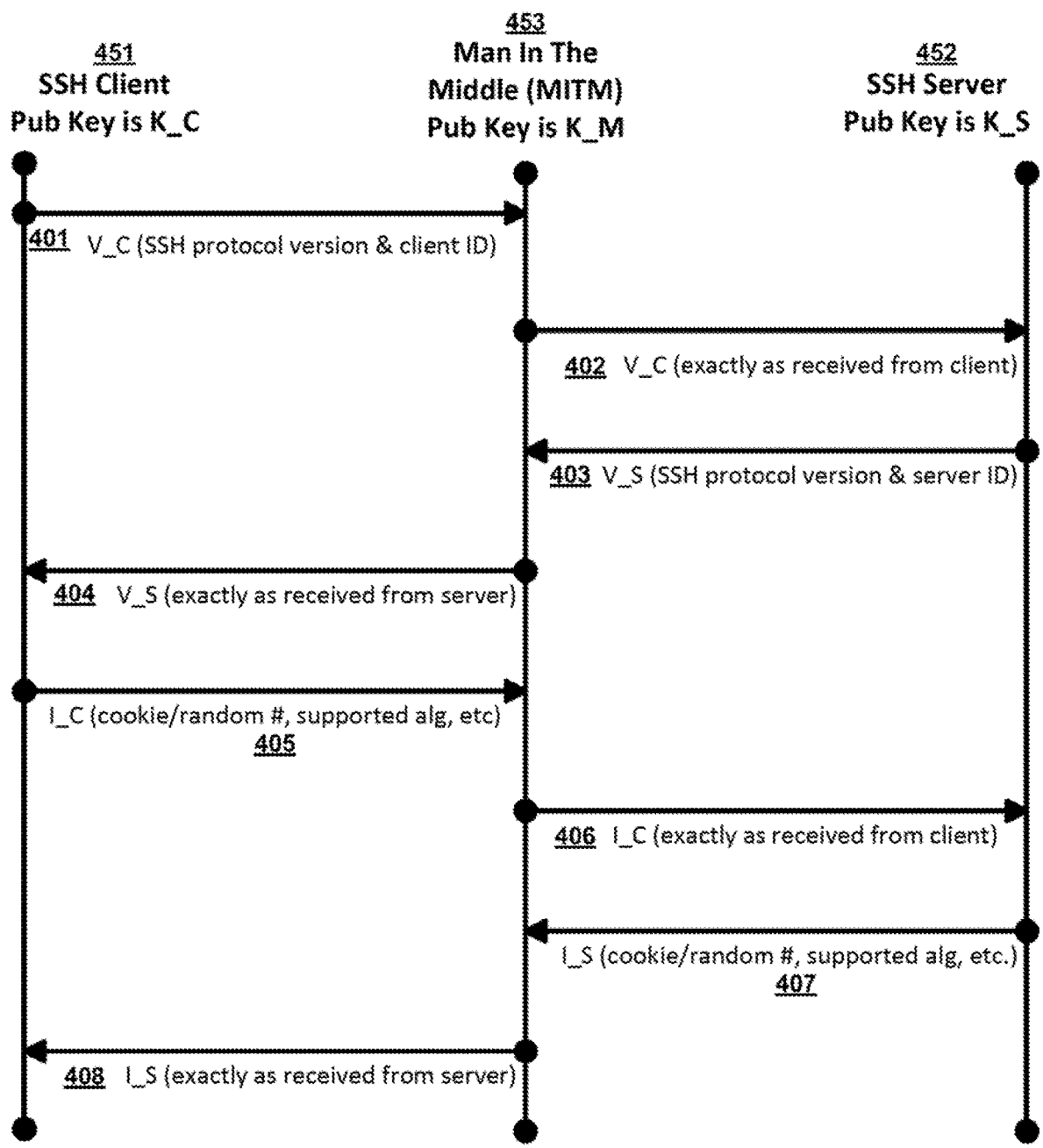
FIG. 4A depicts a portion of a use case diagram corresponding to embodiments of a Secure Shell (SSH) protocol for providing secure communications, employing implicit RSA key pairs, in the presence of a man-in-the-middle attack.
Figure 4B:
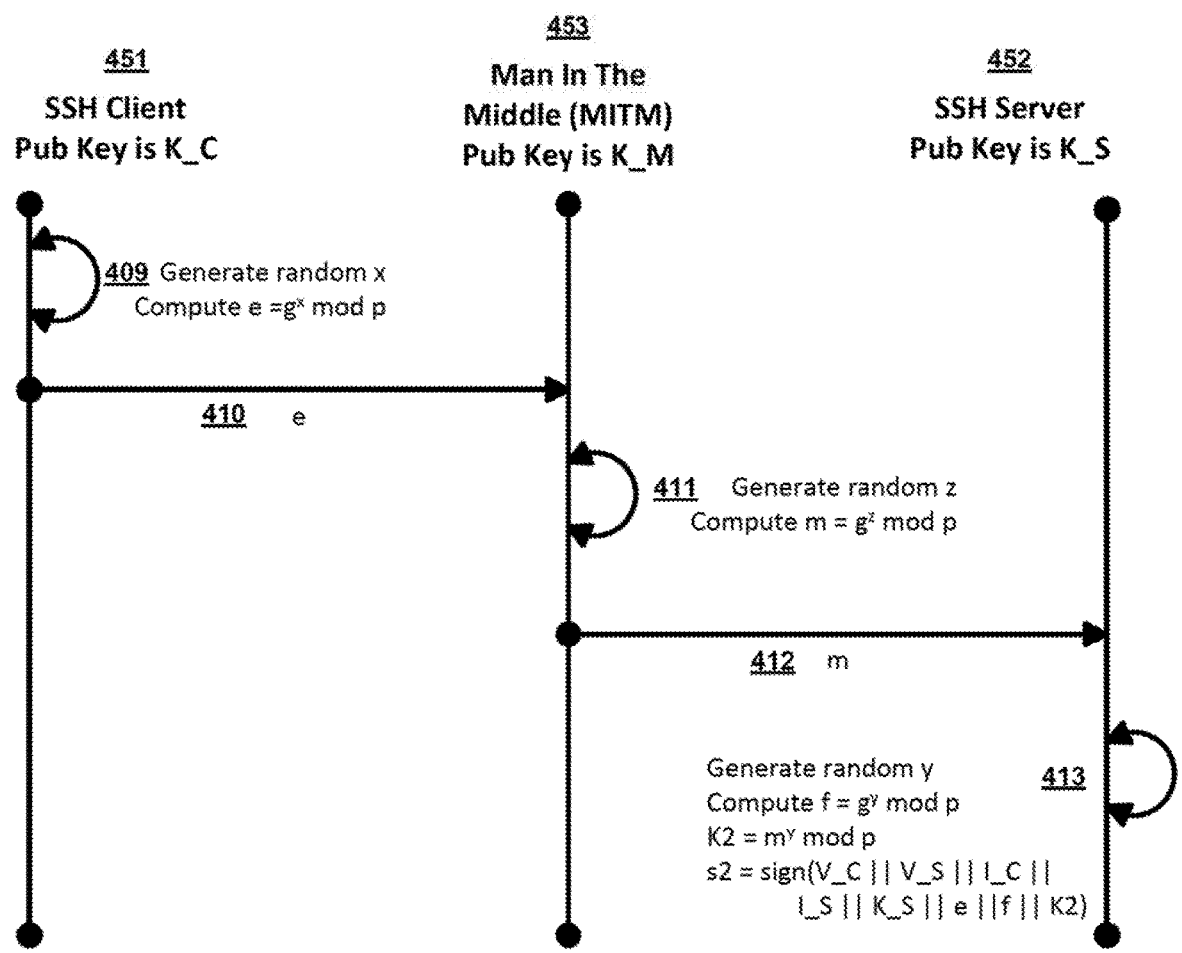
FIG. 4B depicts a further portion of the use case diagram of FIG. 4A.
Figure 4C:
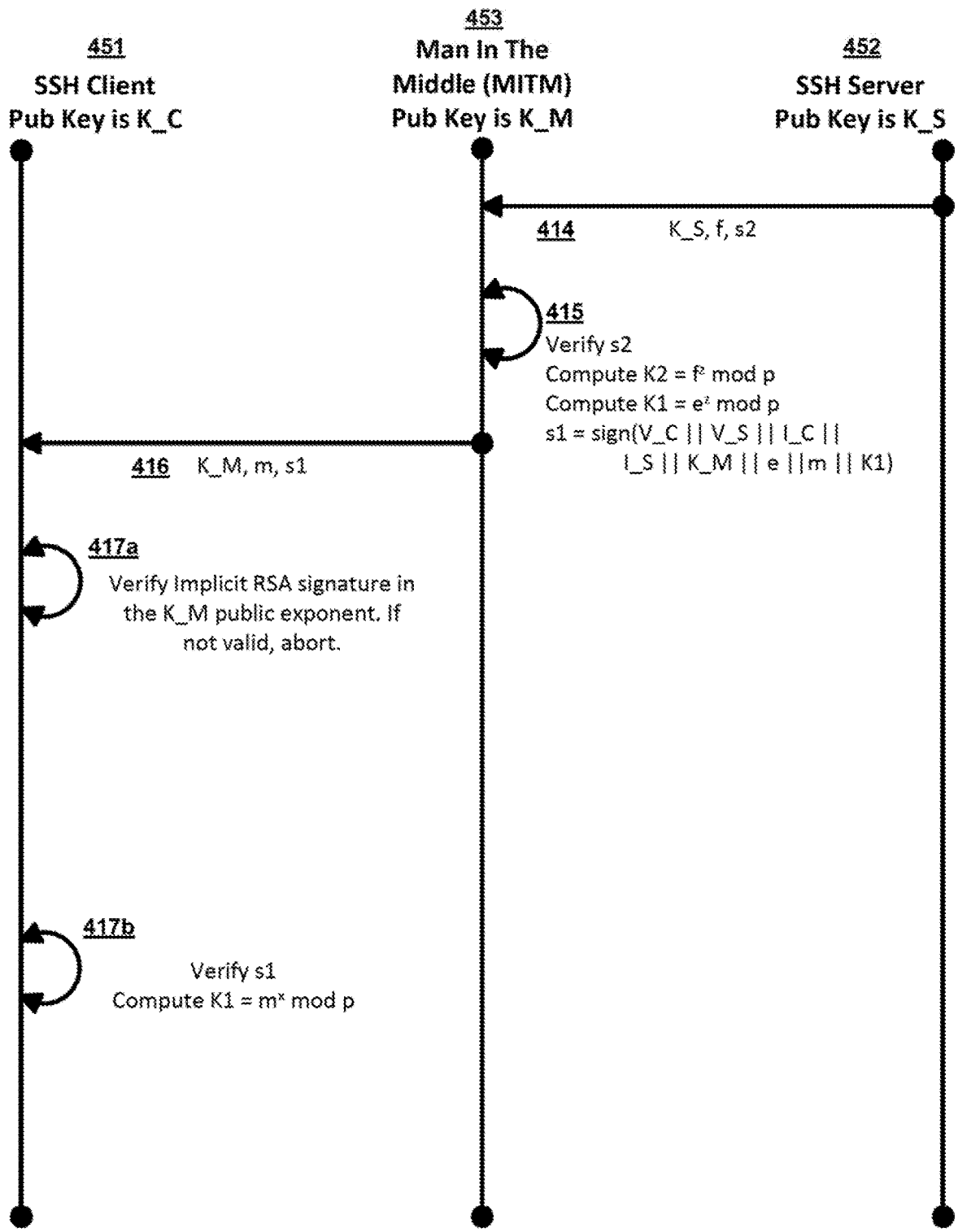
FIG. 4C depicts a further portion of the use case diagram of FIG. 4A and FIG. 4B.
Figure 4D:
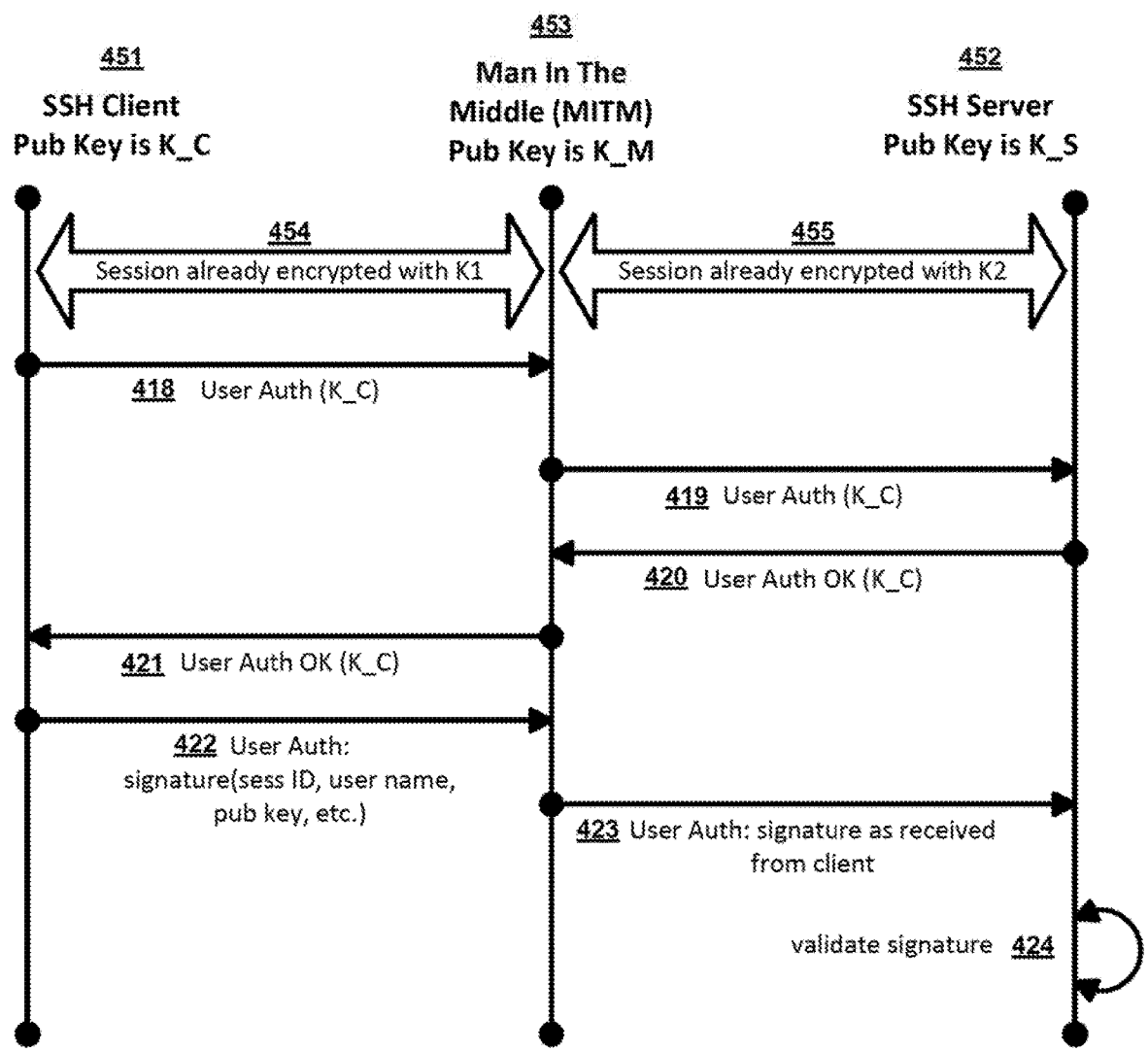
FIG. 4D depicts a further portion of the use case diagram of FIG. 4A, FIG. 4B, and FIG. 4C.
Figure 5A:
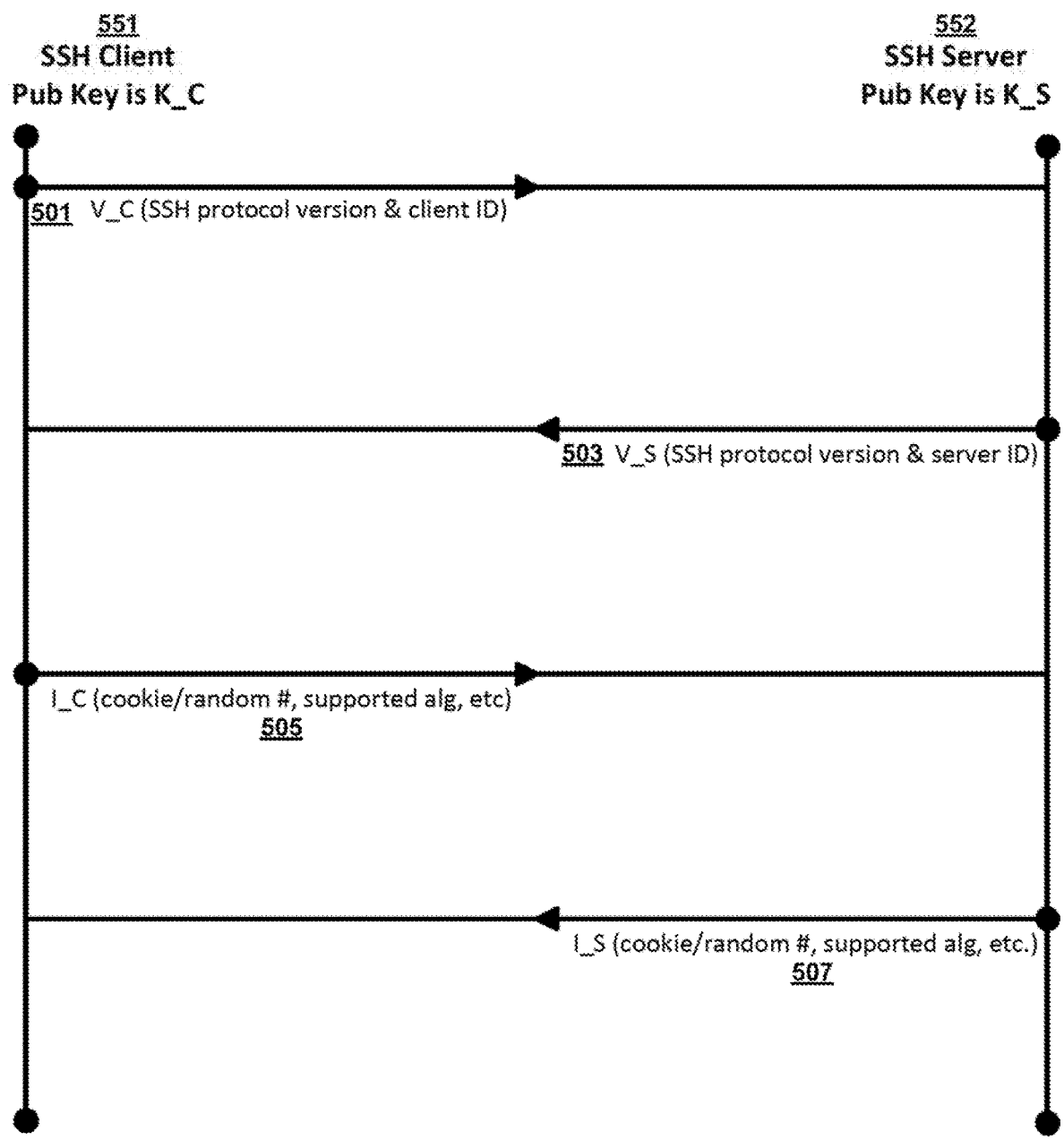
FIG. 5A depicts a portion of a use case diagram corresponding to embodiments of a Secure Shell (SSH) protocol for providing secure communications, employing implicit RSA key pairs.
Figure 5B:
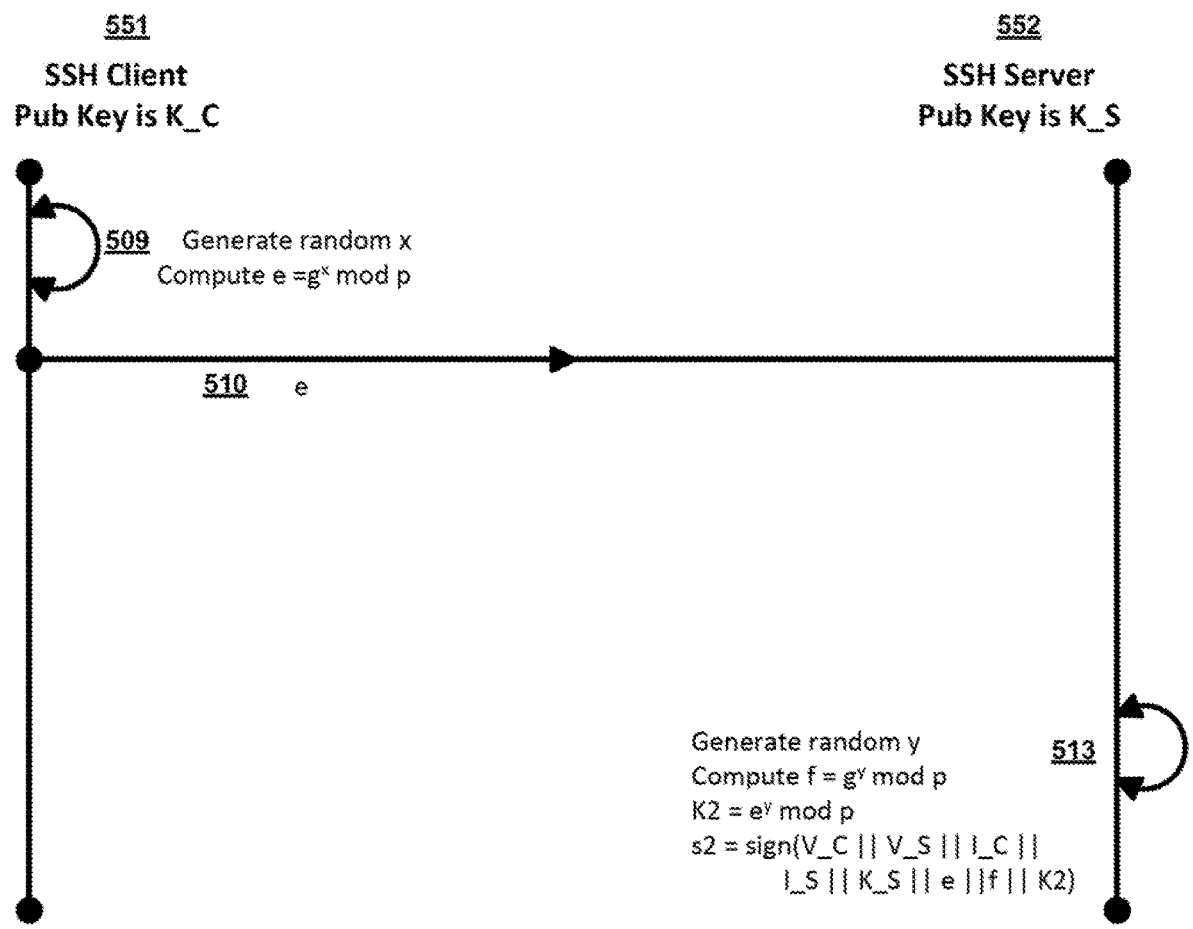
FIG. 5B depicts a further portion of the use case diagram of FIG. 5A.
Figure 5C:
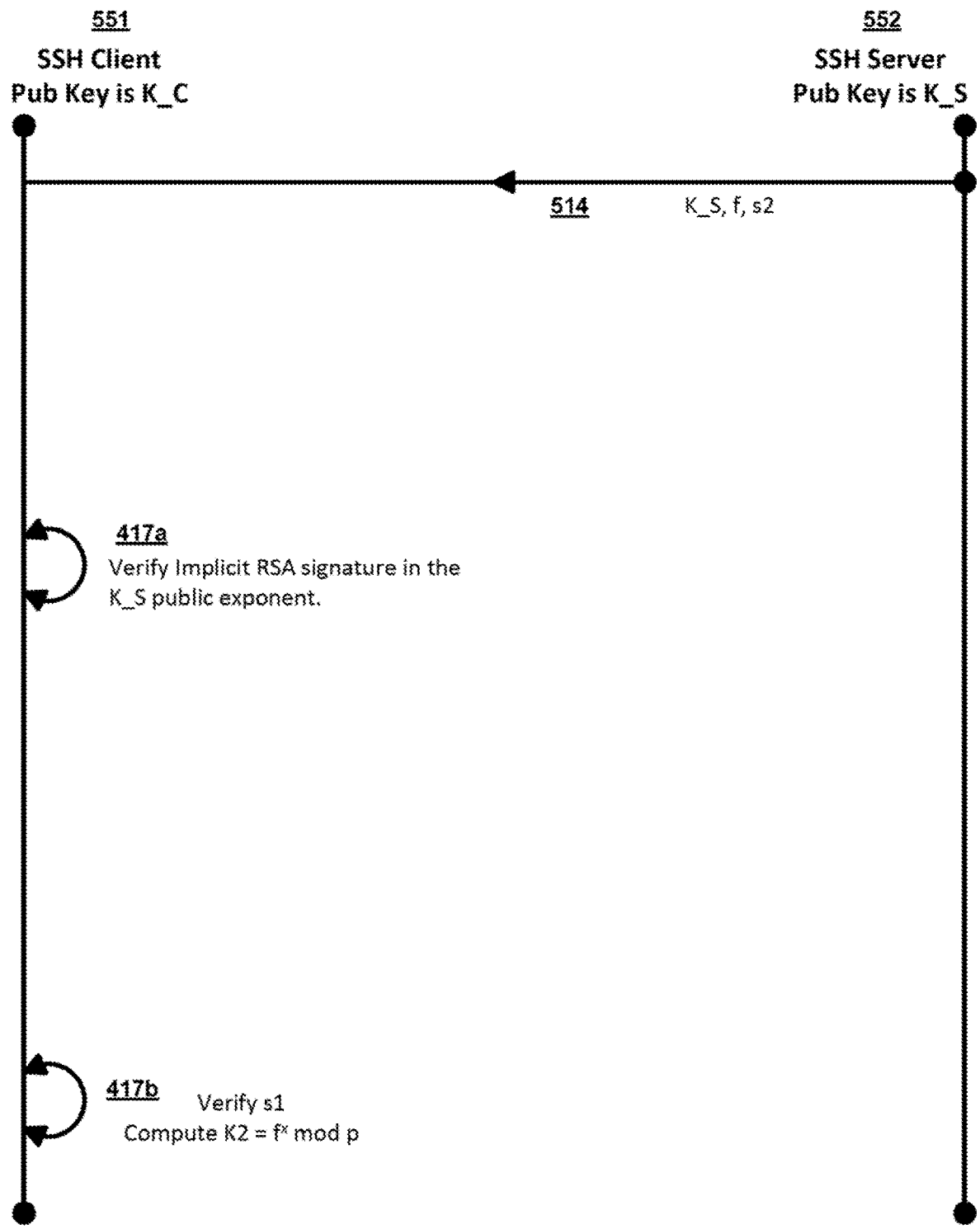
FIG. 5C depicts a further portion of the use case diagram of FIG. 5A and FIG. 5B.
Figure 5D:
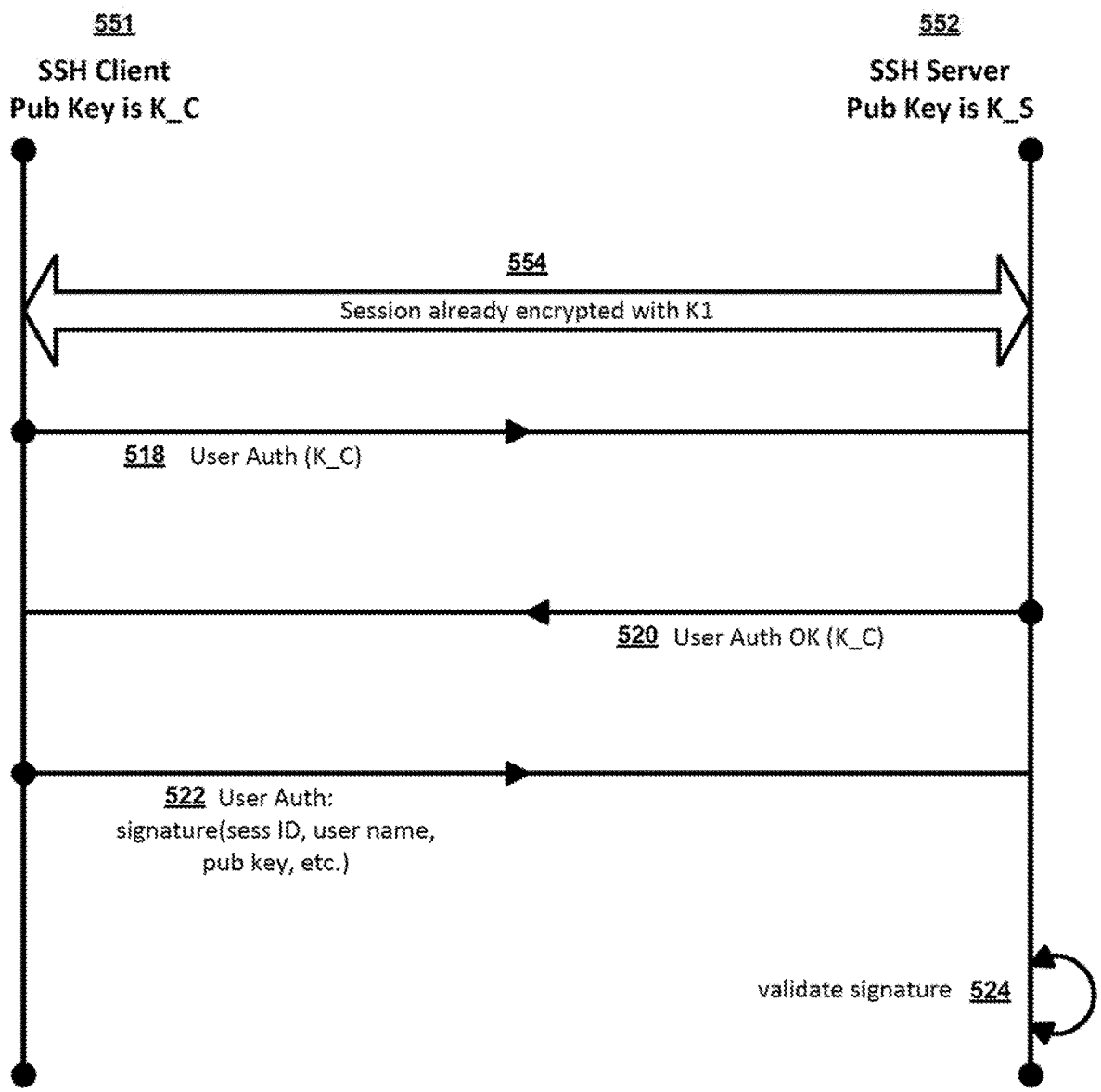
FIG. 5D depicts a further portion of the use case diagram of FIG. 5A, FIG. 5B, and FIG. 5C.

FIG. 3D depicts an exemplary embodiment of a device with a RSA certificate signed by the manufacturer, interacting with a network operator. A device such as device 361, as depicted and described in FIG. 3C, can be in communication with a network operator 370. Device 361 can provide a certificate request 365 to network operator 370. The certificate request can comprise a PKCS #10 certificate request. That request can comprise an RSA key pair comprising an implicit RSA certificate corresponding to a manufacturer of device 361. Network operator 370 can verify a signature inside the public key exponent e of the RSA key pair; that signature can correspond to the manufacturer. In response, network operator 370 can provide another signed certificate 366 that can be a X.509 certificate. Certificate 370 can comprise network operator's 370 signature. Certificate 370 can further comprise the RSA key pair comprising an implicit RSA certificate corresponding to a manufacturer of device 361. Thus an entity receiving certificate 366 can cryptographically validate the identities of both the device manufacturer and the network operator 370.

FIGS. 4A, 4B, 4C, and 4D together depict a use case diagram corresponding to embodiments of a Secure Shell (SSH) protocol for providing secure communications, employing implicit RSA key pairs, in the presence of a man-in-the-middle (MITM) attack. Many of the steps depicted relate to well-known techniques of Diffie-Hellman key exchange. Some embodiments of SSH comprise Diffie-Hellman key exchange techniques.

In step 401, SSH client 451 sends its SSH protocol version and ID to SSH server 452. The message is depicted as V_C(SSH protocol version & client ID). This communication is intercepted by a man-in-the-middle attack entity, MITM 453. In step 402, MITM forwards the message of step 401 to the intended SSH server. In step 403, SSH server sends its SSH protocol version and ID to the client. This message is depicted as V_S(SSH protocol version & server ID). This communication is intercepted by MITM. In step 404, MITM forwards the message of step 403 to the original SSH client. In step 405, SSH client generates a random nonce called a cookie and transmits it to SSH server. This message is depicted as I_C(cookie/random #, supported alg, etc.). This communication is intercepted by MITM. In step 406, MITM forwards the message of step 405 to the intended SSH server.

Further, in step 407, SSH server generates its own cookie in a similar fashion to step 405 and transmits it to SSH client. This message is depicted as I_S(cookie/random #, supported alg, etc.). This communication is intercepted by MITM. In step 408, MITM forwards the server's cookie of step 407, without modification, to the SSH client. In step 409, SSH client generates a random Diffie-Hellman key pair. In step 410, SSH client sends the public key (e) of the client to SSH server. This communication is intercepted by MITM. In step 411, MITM generates a different random Diffie-Hellman key pair, including public key (m). In step 412, MITM sends its substitute public key (m) to SSH server. In step 413, SSH server generates its own Diffie-Hellman key pair. SSH server computes a Diffie-Hellman shared secret K2 based on the server's Diffie-Hellman private key and MITM's Diffie-Hellman public key (m). At this point SSH server can assume that (m) corresponds to SSH client, and that K2 is a shared secret between SSH client and SSH Server. However, at this point K2 can actually be a shared secret between MITM and SSH server.

SSH server computes a digital signature s2 using its long-term signing key. The signature covers parameters in all of the previously received messages, the Diffie-Hellman shared secret K2, and the long-term public key K_S of the SSH server. In step 414, SSH server sends its Diffie-Hellman public key (f), its long-term public key (K_S), and signature (s2) to the client. This communication is intercepted by MITM. In step 415, MITM performs actions similar to those of the SSH server in step 413.

MITM computes a copy of the shared secret K2 based on MITM's Diffie-Hellman private key and SSH server's Diffie-Hellman public key. MITM computes another Diffie-Hellman shared secret K1 based on MITM's Diffie-Hellman private key and SSH client's Diffie-Hellman public key (e). This K1 becomes a shared secret between SSH client and MITM.

MITM computes a digital signature s1 in the same manner as described in regard to step 413 for the SSH server, except that the Diffie-Hellman public keys are those of SSH client and MITM, and MITM's long term public verification key K_M is included.

In step 416, MTIM sends its long-term public key K_M, its Diffie-Hellman public key m, and the generated signature s1 to SSH client. Step 417a can be added to typical SSH client implementations in order to utilize the advantageous functionality of RSA key pairs that implicitly include the Certificate Authority's digital signature. Notably, in some embodiments step 417a can comprise essentially the only modification of a standard SSH client embodiment that is necessary to practice 'implicit RSA certificates' techniques as herein disclosed. In step 417a, SSH client can attempt to verify the signature in the K_M public exponent. Such a verification will typically fail because MITM is unable to generate a valid K_M comprising the Certificate Authority's digital signature. That is, SSH client 451 can detect that K_M comprises an invalid public key. In response to such detection, the secure session protocol can be aborted, thus thwarting the MITM attack.

Absent step 417a, signature verification can succeed in step 417b. As a result, SSH client and MITM can have a shared secret K1 that can be subsequently employed in exchanging messages. MITM and server have their own shared secret K2. SSH client and SSH server can continue to assume that they are exchanging messages over a secure channel with each other. However, all such communications are actually passing through the MITM, and the MITM can decrypt and compromise the communications that are assumed to be secret.

In step 417b, SSH client can verify the signature with MITM's public key sent in the same message of step 416. In some typical embodiments, a SSH client can query a user whether to trust this public key. A typical user response approves trusting the public key. SSH client can then compute a copy of the shared secret K1.

At this point there is a shared key K1 and secure session 454 set up between SSH client and MITM and there is a separate shared key K2 and a separate secure session 455 set up between MITM and SSH server. SSH client and SSH server can both remain unaware that their communications are with MITM and not with each other. SSH client has yet to authenticate itself to SSH server, utilizing its RSA public key. Steps 418 through 424 can accomplish such authentication.

In step 418, SSH client sends a User Auth (K_C) message to SSH server, requesting public key based authentication rather than password-based authentication. The message is intercepted by MITM over secure session 454. In step 419, MITM forwards the message of step 418 to SSH server, without modification, over another secure session 455. In step 420, SSH server can check its SSH security policy and send an approving User Auth OK (K_C) message to MITM.

In step 421, MITM forwards the User Auth OK (K_C) message of step 420, without modification, to SSH client. In step 422, SSH client can generate a signature over the current session ID, user name, user public key and other information. The signature along with the user name and public key is sent to MITM over secure session 451, although SSH client can assume that the message is sent to SSH server. Such a message is depicted as signature (sess ID, user name, pub key, etc.). In step 423, MITM forwards the message of step 451, without modification, to SSH server. In step 424, SSH server can check if the user indicated in step 422 can be found in a list of authorized users. If found, SSH server can proceed to validate the signature.

At this point SSH server trusts MITM and can assume that MITM embodies a legitimate SSH client. On that basis, SSH server can now accept commands from MITM. Thus the MITM attack has succeeded and MITM can control operation of SSH server.

In alternative embodiments, following step 417b, SSH client can authenticate to SSH server by password. Following step 417b, SSH client simply sends its password to MITM under the assumption that MITM is the SSH server. Thus the client's password can be compromised by MITM. In some scenarios, MITM can forward the password to SSH server. Alternatively, MITM can drop all present connections and retain the password to log into SSH server at another time.

FIGS. 5A, 5B, 5C, and 5D together depict a use case diagram corresponding to embodiments of a Secure Shell (SSH) protocol for providing secure communications, employing implicit RSA key pairs. These figures depict operation of some embodiments, absent a man-in-the-middle attack. FIGS. 5A 5B 5C 5D respectively correspond to FIGS. 4A 4B 4C 4D. Taken together, the figures illustrate that embodiments can operate secure from security compromise with or without the man-in-the-middle attack, while utilizing the same protocol implementations. Many of the steps depicted relate to well-known techniques of Diffie-Hellman key exchange. Some embodiments of SSH comprise Diffie-Hellman key exchange techniques.

In step 501, SSH client 551 sends its SSH protocol version and ID to SSH server 552. The message is depicted as V_C(SSH protocol version & client ID). In step 503, SSH server sends its SSH protocol version and ID to the client. This message is depicted as V_S(SSH protocol version & server ID). In step 505, SSH client generates a random nonce called a cookie and transmits it to SSH server. This message is depicted as I_C(cookie/random #, supported alg, etc.). In step 507, SSH server generates a cookie in a similar fashion to that of step 505 and transmits it to the client. This message is depicted as I_S(cookie/random #, supported alg, etc.). In step 509, SSH client generates a random Diffie-Hellman key pair. In step 510, SSH client sends the public key (e) of SSH client to SSH server. In step 513, SSH server generates its own Diffie-Hellman key pair. SSH server computes a Diffie-Hellman shared secret K2 based on the server's Diffie-Hellman private key and SSH client's Diffie-Hellman public key (e). At this point SSH server can assume that (e)

corresponds to the SSH client, and that K2 is a shared secret between SSH client and SSH Server.

SSH server computes a digital signature s2 using its long-term signing key. The signature covers parameters in all of the previously received messages, the Diffie-Hellman shared secret K2, and the long-term public key K_S of the SSH server.

In step 514, SSH server sends its Diffie-Hellman public key (f), its long-term public key (K_S), and signature (s2) to the client. Similarly and as depicted and described for step 417a, step 517a can be added to typical SSH client implementations in order to utilize the advantageous functionality of RSA key pairs that implicitly include the Certificate Authority's digital signature. In step 517a, SSH client can attempt to verify the signature in the K_M public exponent. Absent a man-in-the-middle attack, such a verification can succeed because SSH server is able to provide a valid K_M comprising the Certificate Authority's digital signature.

Signature verification can succeed in step 517b. As a result, SSH client and SSH server can have a shared secret K2 that can be subsequently employed in exchanging messages. SSH client and SSH server can continue to assume that they are exchanging messages over a secure channel with each other. In step 517b, SSH client can verify signature s1 with public key K_S sent in the message of step 514. In some typical embodiments, a SSH client can query a user whether to trust this public key. A typical user response approves trusting the public key. SSH client can then compute a copy of the shared secret K2.

At this point there is a shared key K1 and secure session 554 set up between SSH client and SSH server. SSH client has yet to authenticate itself to SSH server, utilizing its RSA public key. Steps 518 through 524 can accomplish such authentication.

In step 518, SSH client sends a User Auth (K_C) message to SSH server, requesting public key based authentication rather than password-based authentication. In step 520, SSH server can check its SSH security policy and send an approving User Auth OK (K_C) message to SSH client. In step 522, SSH client can generate a signature over the current session ID, user name, user public key and other information. The signature along with the user name and public key can be sent to SSH server over secure session 554. Such a message is depicted as signature (sess ID, user name, pub key, etc.). In step 524, SSH server can check if the user indicated in step 522 can be found in a list of authorized users. If found, SSH server can proceed to validate the signature.

At this point SSH server trusts the SSH client. On that basis, SSH server can now accept commands from SSH client. Thus SSH client can control operation of SSH server.

Performance and Security Enhancements

Performance and security enhancements can be achieved by changing the Certificate Authority's public key size and type. Assuming that the Certificate Authority public key type remains as RSA, its size can be decreased in some embodiments. By way of example and not limitation, in some embodiments the public key size can be decreased to 1024 bits which can result in smaller signatures and therefore a smaller public exponent e in the generated keys. The smaller public exponent can result in faster signature verification.

In some embodiments, more dramatic performance and security enhancements can be achieved by changing the Certificate Authority's public key type and signature algorithm, while the generated keys of end entities remain RSA. In some embodiments, a Certificate Authority's public key can be an Elliptic Curve public key. In some embodiments alternative signature algorithms can be employed such as Elliptic Curve Digital Signature Algorithm (ECDSA) or Edwards Digital Signature Algorithm (EdDSA).

In some embodiments a 256-bit Elliptic Curve public key can result in a security level that is higher than for 2048-bit RSA embodiments. Such an approach can provide 512-bit signatures comprising two 256-bit components r and s. In some embodiments a Certificate Authority public/private key pair can be selected that is based on a 256-bit Elliptic Curve family. This selection can provide for the generation of a 512-bit public exponent e for each new key pair, in contrast to the 2048-bit size of other typical embodiments. Such smaller exponents can significantly improve performance for signature verification, while also improving the security level.

In some such embodiments, key generation time may also speed up by as much as a factor of 2. In some embodiments a Certification Authority can utilize RSA of the same modulus size as end entity keys. In those cases, a signature can be larger than the generated modulus and thus generation of a new modulus can be required. In some embodiments this can be required for approx. half of the proposed moduli. However, in some embodiments Certificate Authority signatures are significantly smaller than the generated RSA modulus (e.g., 512 bits), thus every e can be of smaller size than the modulus, eliminating any need to re-generate moduli.

Additional Information in the Public Exponent

In some embodiments a Certificate Authority signature can be much smaller than the RSA modulus size. As described herein, a Certificate Authority can use a more compact crypto system than RSA, such as Elliptic Curve. In some embodiments, rather than utilizing the reduced size of an ECDSA or EdDSA signature chiefly to provide a smaller public exponent e, additional items of information can be packed inside e, in addition to the signature. In some embodiments these additional items can be concatenated with the signature, thereby providing e. In some embodiments these additional items can have significant utility. These additional items are depicted and described as descriptive attributes 214 in relation to FIG. 2. Notably, in some embodiments a Certificate Authority can generate a signature responsive to the modulus and further responsive to each of the items of the descriptive attributes 214. That is, the signature can be over a hash over all of the items as well as over the modulus n. In alternative embodiments a Certificate Authority can generate a signature responsive to the modulus and not responsive to any of the descriptive attributes 214.

Thus for embodiments in which a Certificate Authority generates compact signatures that are much shorter than the size of the RSA modulus, there can be a tradeoff of performance against the utility of additional information that can be included in the implicit RSA certificate.

In some system embodiments, the use of public keys with an embedded signature such as implicit RSA certificates can be advantageously combined with the publishing of public keys in a directory.

Some system embodiments employ PGP (Pretty Good Privacy) as defined in IETF RFC 4880. Aspects of such systems can include each of many users generating a corresponding PGP key pair, and the corresponding public key being published in a PGP directory. One user can look up a PGP public key in the PGP directory to verify another user's public key. In some such embodiments, absent digital certificates signed by a Certificate Authority, validation of a user that publishes a corresponding PGP public key can be limited to verification of that user's email address.

In some other embodiments, much stronger validation can be provided by employing digital certificates signed by a Certificate Authority. A public key can include a Certificate Authority signature, such as an embodiment wherein the public key comprises an implicit RSA certificate. A PGP directory service can function properly without knowledge of how PGP public keys are constructed. A first PGP user can exchange messages with a second PGP user. The first user can verify an implicit RSA signature of the second user, thus providing stronger confidence to the first user that the second user is accurately identified.

Those skilled in the art can recognize that such stronger validation can thus be provided in many system embodiments wherein users, applications and/or devices publish their corresponding public keys in a common directory.

Figure 6:
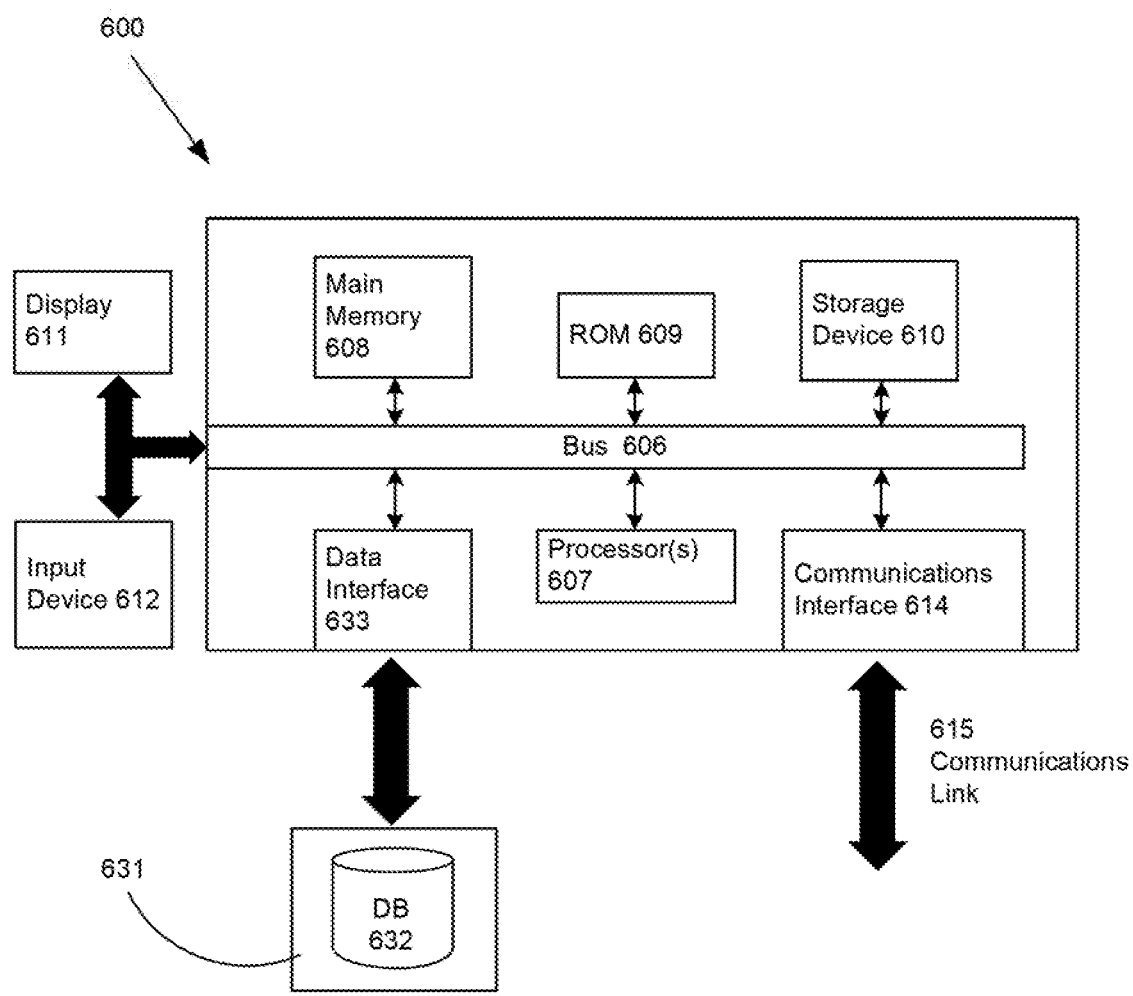
FIG. 6 depicts an exemplary computer system.

The execution of the sequences of instructions required to practice the embodiments can be performed by a computer system 600 as shown in FIG. 6. In an embodiment, execution of the sequences of instructions is performed by a single computer system 600. According to other embodiments, two or more computer systems 600 coupled by a communication link 615 can perform the sequence of instructions in coordination with one another. Although a description of only one computer system 600 will be presented below, however, it should be understood that any number of computer systems 600 can be employed to practice the embodiments.

A computer system 600 according to an embodiment will now be described with reference to FIG. 6, which is a block diagram of the functional components of a computer system 600. As used herein, the term computer system 600 is broadly used to describe any computing device that can store and independently run one or more programs.

Each computer system 600 can include a communication interface 614 coupled to the bus 606. The communication interface 614 provides two-way communication between computer systems 600. The communication interface 614 of a respective computer system 600 transmits and receives electrical, electromagnetic or optical signals, that include data streams representing various types of signal information, e.g., instructions, messages and data. A communication link 615 links one computer system 600 with another computer system 600. For example, the communication link 615 can be a LAN, in which case the communication interface 614 can be a LAN card, or the communication link 615 can be a PSTN, in which case the communication interface 614 can be an integrated services digital network (ISDN) card or a modem, or the communication link 615 can be the Internet, in which case the communication interface 614 can be a dial-up, cable or wireless modem.

A computer system 600 can transmit and receive messages, data, and instructions, including program, i.e., application, code, through its respective communication link 615 and communication interface 614. Received program code can be executed by the respective processor(s) 607 as it is received, and/or stored in the storage device 610, or other associated non-volatile media, for later execution.

In an embodiment, the computer system 600 operates in conjunction with a data storage system 631, e.g., a data storage system 631 that contains a database 632 that is readily accessible by the computer system 600. The computer system 600 communicates with the data storage system 631 through a data interface 633. A data interface 633, which is coupled to the bus 606, transmits and receives electrical, electromagnetic or optical signals, that include data streams representing various types of signal information, e.g., instructions, messages and data. In embodiments, the functions of the data interface 633 can be performed by the communication interface 614.

Computer system 600 includes a bus 606 or other communication mechanism for communicating instructions, messages and data, collectively, information, and one or more processors 607 coupled with the bus 606 for processing information. Computer system 600 also includes a main memory 608, such as a random access memory (RAM) or other dynamic storage device, coupled to the bus 606 for storing dynamic data and instructions to be executed by the processor(s) 607. The main memory 608 also can be used for storing temporary data, i.e., variables, or other intermediate information during execution of instructions by the processor(s) 607.

The computer system 600 can further include a read only memory (ROM) 609 or other static storage device coupled to the bus 606 for storing static data and instructions for the processor(s) 607. A storage device 610, such as a magnetic disk or optical disk, can also be provided and coupled to the bus 606 for storing data and instructions for the processor(s) 607.

A computer system 600 can be coupled via the bus 606 to a display device 611, such as, but not limited to, a cathode ray tube (CRT) or a liquid-crystal display (LCD) monitor, for displaying information to a user. An input device 612, e.g., alphanumeric and other keys, is coupled to the bus 606 for communicating information and command selections to the processor(s) 607.

According to one embodiment, an individual computer system 600 performs specific operations by their respective processor(s) 607 executing one or more sequences of one or more instructions contained in the main memory 608. Such instructions can be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 607. Such a medium can take many forms, including, but not limited to, non-volatile, volatile and transmission media. Non-volatile media, i.e., media that can retain information in the absence of power, includes the ROM 609, CD ROM, magnetic tape, and magnetic discs. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A method for secure digital communications comprising the steps of: generating by a certificate authority an asymmetric key pair comprising a first public key and a private key; and providing in the first public key descriptive attributes and a digital signature, wherein the digital signature is responsive to at least part of the first public key, wherein the asymmetric key pair is a Rivest, Shamir, and Adelman (RSA) key pair, wherein the asymmetric key pair further comprises a modulus n and a public key exponent e, wherein the public key exponent e includes the descriptive attributes and the digital signature, wherein a first portion of the public key exponent e is allocated to descriptive attributes, wherein a second portion of the public key exponent e is allocated to the digital signature, wherein the digital signature is responsive to the modulus and the descriptive attributes, wherein the first portion of the public key exponent e comprises most significant bits (MSB) of the public key exponent e as allocated to descriptive attributes, and wherein the second portion of the public key exponent e comprises least significant bits (LSB) of the public key exponent e as allocated to the digital signature.

2. The method of claim 1 further comprising the steps of: passing the modulus and the public key exponent from a first system to a second system; establishing a secure session between the first system and the second system, within a secure digital communication protocol, responsive to the modulus and the public key exponent; and verifying by the second system the digital signature, responsive to the modulus and the public key exponent, thereby authenticating the first public key.

3. The method of claim 2, wherein the secure digital communication protocol is Secure Shell (SSH).

4. The method of claim 2, wherein the descriptive attributes comprise a name corresponding to the Certificate Authority.

5. The method of claim 2, wherein the descriptive attributes comprise a validity period corresponding to the first public key.

6. The method of claim 2, wherein the descriptive attributes comprise a unique identity corresponding to a customer premises equipment device.

7. The method of claim 2 further comprising the step of: installing the RSA key pair in a customer premises equipment device, wherein installation of the RSA key pair takes place within a customer premises equipment device manufacturing facility.

8. The method of claim 2 further comprising the steps of: generating large random prime numbers p and q according to an RSA algorithm; applying validity tests to a first candidate public key exponent, thereby determining that the first candidate public key exponent is invalid; and regenerating p and q upon determining that the first candidate public key exponent is invalid, thereby providing a second candidate public key exponent, wherein the modulus is responsive to p and q.

9. The method of claim 8, wherein a Certificate Authority public key corresponds to the Certificate Authority, and wherein the Certificate Authority public key is an Elliptic Curve public key.

10. The method of claim 9, wherein the Certificate Authority employs an Elliptic Curve Digital Signature Algorithm or an Edwards Digital Signature Algorithm, thereby providing the digital signature.

11. The method of claim 1 further comprising the steps of: passing the modulus and the public key exponent from a first system to a second system; establishing a secure session between the first system and the second system, within a secure digital communication protocol, responsive to the modulus and the public key exponent; detecting by the second system an invalid public key, responsive to the modulus and the public key exponent; and aborting the secure session, responsive to the detection of an invalid public key.

12. The method of claim 11, wherein the secure digital communication protocol is Secure Shell (SSH).

13. The method of claim 11, wherein the descriptive attributes comprise a name corresponding to the Certificate Authority.

14. The method of claim 11, wherein the descriptive attributes comprise a validity period corresponding to the first public key.

15. The method of claim 11, wherein the descriptive attributes comprise a unique identity corresponding to a customer premises equipment device.

16. The method of claim 11 further comprising the step of: installing the RSA key pair in a customer premises equipment device, wherein installation of the RSA key pair takes place within a customer premises equipment device manufacturing facility.

17. The method of claim 11 further comprising the steps of: generating large random prime numbers p and q according to an RSA algorithm; applying validity tests to a first candidate public key exponent, thereby determining that the first candidate public key exponent is invalid; and regenerating p and q upon determining that the first candidate public key exponent is invalid, thereby providing a second candidate public key exponent, wherein the modulus is responsive to p and q.

18. The method of claim 17, wherein a Certificate Authority public key corresponds to the Certificate Authority, and wherein the Certificate Authority public key is an Elliptic Curve public key.

19. The method of claim 18, wherein the Certificate Authority employs an Elliptic Curve Digital Signature Algorithm or an Edwards Digital Signature Algorithm, thereby providing the digital signature.

* * * * *